(12) United States Patent
Callsen

(10) Patent No.: US 6,247,039 B1
(45) Date of Patent: *Jun. 12, 2001

(54) METHOD AND APPARATUS FOR DISPOSING OF OBJECTS IN A MULTI-THREADED ENVIRONMENT

(75) Inventor: Christian J. Callsen, Menlo Park, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 18 days.

(21) Appl. No.: 08/650,314

(22) Filed: May 17, 1996

(51) Int. Cl.$^7$ ....................................................... G06F 9/00
(52) U.S. Cl. ............................ 709/101; 707/103; 707/100
(58) Field of Search ................................... 395/683, 670, 395/676, 701; 709/303, 100, 106, 102, 103, 104, 300; 707/100, 103

(56) References Cited

U.S. PATENT DOCUMENTS

| 4,809,168 | 2/1989 | Hennessy et al. | 364/200 |
| 5,329,619 | * 7/1994 | Page'et al. | 395/200 |
| 5,692,183 | * 11/1997 | Hapner et al. | 395/614 |

FOREIGN PATENT DOCUMENTS 0514112   11/1992  (EP) .

* cited by examiner

Primary Examiner—Majid Banankhah
(74) Attorney, Agent, or Firm—The Hecker Law Group (57) ABSTRACT

A method and apparatus for providing thread-safe disposal of objects in a multi-threaded computer environment. When a thread from a process sends a call to delete an object, that thread typically waits for other threads interacting with that same object to clear. During this waiting period, it is common to have other threads invoking the same object, thus increasing rather than decreasing the number of active threads for that object. Also, problems arise when more than one thread attempts to delete the object. However, the present invention associates a state machine with each object. When an invocation of an object is made, the state machine is queried to detect the state. Invocations made on the object after the occurrence of a delete call interpret the object as having been deleted, and are not added to the active invocations for that object. Further, subsequent delete calls also interpret the object as having been deleted, and return a failure indication. The initial delete call returns success when the object is finally deleted. Thus, new invocations are precluded and multiple delete calls are handled appropriately.

33 Claims, 7 Drawing Sheets

METHOD AND APPARATUS FOR DISPOSING OF OBJECTS IN A MULTI-THREADED ENVIRONMENT

BACKGROUND OF THE INVENTION

1. Field of the Invention

This invention relates to the field of object-oriented programming in a computer environment.

2. Background

In multi-threaded computer environments of the prior art, when a thread from a process sends a call to delete an object, that thread typically waits for other threads interacting with that same object to clear. During this waiting period, it is common to have other threads invoking the same object, thus increasing rather than decreasing the number of active threads for that object. There is therefore no guarantee that the object will be deleted at all, let alone in a reasonable amount of time. Also, problems arise in the prior art when more than one thread attempts to delete the object. Typically, each deleting thread waits until the other threads have cleared, thus increasing the number of waiting threads unnecessarily.

Objects are self-contained, clearly defined, software modules that encapsulate procedures, such as business practices, and their data. Communicating with each other through carefully defined interfaces, objects allow complex solutions to be constructed similar to the manner in which computers are manufactured from standardized electronic components. Multiple levels of re-use and standardization are made possible, enabling engineers to produce modules, applications, and entire systems that are highly reusable and leveragable.

Networked object technology allows applications access to objects and their shared services anywhere in the network, substantially independent of where the application or object resides. Networked objects also permit individual objects to be updated without the risk of disrupting the application or business process it models, facilitating the graceful, incremental evolution of complex systems. For example, if a new component fails, the component's predecessor can be re-instated quickly and transparently.

An example of the networked object environment is the CORBA-compliant NEO product family from SunSoft™, which provides for sharing of objects across networks and differing computing platforms.

Consisting of over 600 software vendors, developers, and end user organizations, the Object Management Group (OMG) has developed and continues to develop standards for a common architecture supporting heterogeneous, distributed, object-oriented applications. The OMG Common Object Request Broker Architecture (CORBA) is designed to allow different object systems from multiple vendors to interact with each other on a network. The CORBA specification comprises the following four components:

i) An Object Request Broker (ORB) to manage objects in a networked environment;

ii) Interoperability for ORB-to-ORB communications;

iii) Common Object Services (CORBAservices); and iv) Mappings for commonly used programming languages.

The Network Object Request Broker (ORB) is a CORBA-compliant network-based software system providing for the seamless location and execution of objects through a standard interface protocol, enabling objects and programs to transparently interact with each other across the network. The NEO ORB is implemented as one or more multi-threaded UNIX processes, providing scalable performance and availability as needed.

To promote heterogeneous object interoperability, the OMG has provided a portable source code reference implementation of the CORBA 2.0 Internet Inter-ORB Protocol to assist software vendors in testing and delivering OMG-compliant products. The Internet Inter-ORB Protocol (Internet IOP) provides a standardized way of connecting ORBs from different CORBA 2.0 compliant vendors, enabling them to communicate with each other. The current Internet IOP is based on TCP/IP protocols.

The OMG CORBAservices definition describes the basic operations required for building distributed systems with objects, such as naming, events, properties, lifecycle and relationship services.

For different object systems to interact, language independence is a concern. The Interface Definition Language (IDL) enables the separation of interface and implementation, allowing object implementation details to change without compromising the plug-and-play qualities of the object. The OMG IDL is a neutral interface definition of an object's operations, allowing the behavior of the object to be defined in IDL, but accommodating the automated transformation of the interface to the C, C++, Objective C, or Smalltalk languages A multi-threaded environment, such as that provided by UNIX, is typically used for supporting networked objects. Threads are subprocesses spawned off of larger processes for performing a certain function, e.g. performing a printing process, acting on a database object, etc. By supporting multiple threads, the system can serve many clients and processes simultaneously. This enables the sharing of objects and services on the network. Unfortunately, certain actions performed on an object become more complicated when the object is invoked by more than one thread.

In the CORBA environment, an Object Request Broker Daemon process (ORBD) receives object calls from the client processes registered to it. The ORB daemon then locates the object on the network, and acts as the interface between the client process and the networked object. In the NEO environment, the ORB daemon may activate a NEO object server to act as a further interface for the object which may be a standard NEO object or, in some instances, a legacy process encapsulated in a NEO shell to perform as a NEO object. The NEO object server acts to instantiate the object as is necessary to respond to the calls forwarded by the ORB daemon.

Figure 3:
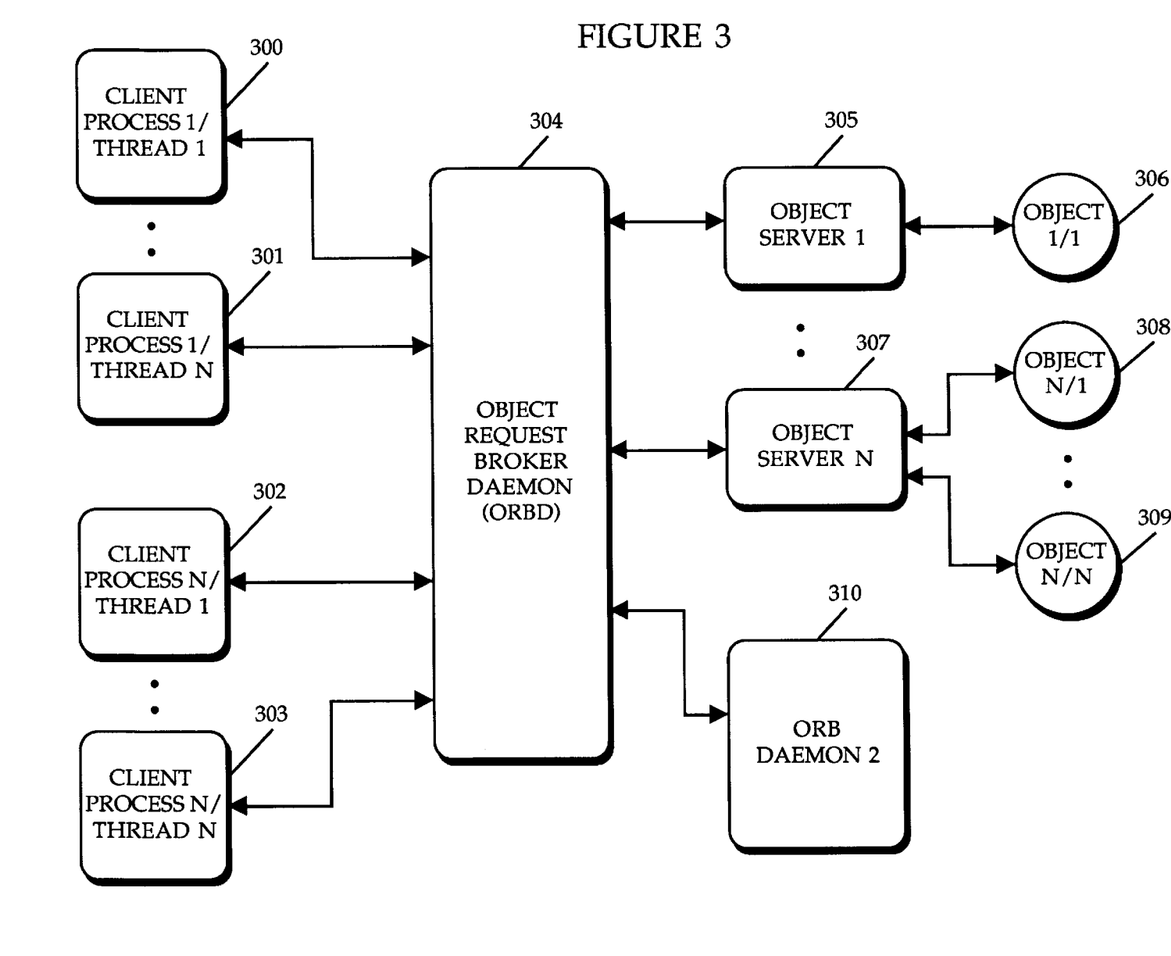
FIG. 3 is a block diagram of a networked object environment, such as that defined under the OMG CORBA specification.

FIG. 3 is a block diagram of a CORBA-compliant networked object system. Multiple threads are represented by elements 300–303, where threads 300–301 are threads spawned from a first client process, Client Process 1, and threads 302–303 are threads spawned from a second client process, Client Process N. As indicated in FIG. 3, a single client process can spawn any number of threads. Each of threads 300–303 is linked to Object Request Broker Daemon (ORBD) process 304. ORBD process 304 is in turn linked to a plurality of object servers represented by object server 305 and object server 307. A second ORBD process, ORBD process 310, is further linked to ORBD process 304. ORBD process 310 could also be coupled to further object servers and/or client processes (not shown). Object server 305 is linked to object 306. Object server 307 is linked to objects 308 and 309.

ORBD process 304 receives object requests in the form of locate calls or requests from client process threads 300–303, and determines which object server is supporting the appropriate object. If the necessary server is not currently running, the server is activated and the object is instantiated. Information on the location of the object is returned in response to the locate call, and further requests between the thread and the object are directed by the location information. The same object can be similarly invoked by locate calls from other threads to establish interaction between the object and all applicable threads concurrently.

ORB daemon 310 may provide a gateway for the networked object environment over a large network such as the Internet and/or it may provide cross-platform interaction by providing a platform dependent interface to clients and object servers in its own domain, while providing a standardized interface to ORBD 304.

Object servers 305 and 307 provide access to objects or object libraries, such as shown by objects 306 and 308–309. Legacy objects, that is those objects comprising stand-alone applications and other objects not originally designed for the networked object environment, are provided with an IDL shell that forms an interface through which the object server can access the functions of the legacy object. As the network is substantially independent of hardware boundaries, the objects and object servers may reside on the same computer as the client processes and the ORB daemon, or they may reside on separate computers within the network. Similarly, the networked object environment is substantially independent of the base level implementation of the network.

As described, in the multi-threaded environment, many threads may concurrently invoke the same object. This can become problematic when, in order to reclaim storage or because the object is no longer valid, etc., one thread wishes to dispose of the object. Disposal of the object is nontrivial due to the number of threads being serviced Abrupt disposal of the object would disrupt the other threads being serviced, complicating the process by requiring further processes for handling client process notification of the disruption and thread recovery. Therefore, in order to avoid disruption of other threads, disposal of the object should take place when the number of threads being serviced by the object is zero. I.e., the disposing thread waits for all other current threads to clear from the object. Unfortunately, in the meantime, more thread invocations for the same object may occur.

Figure 1:
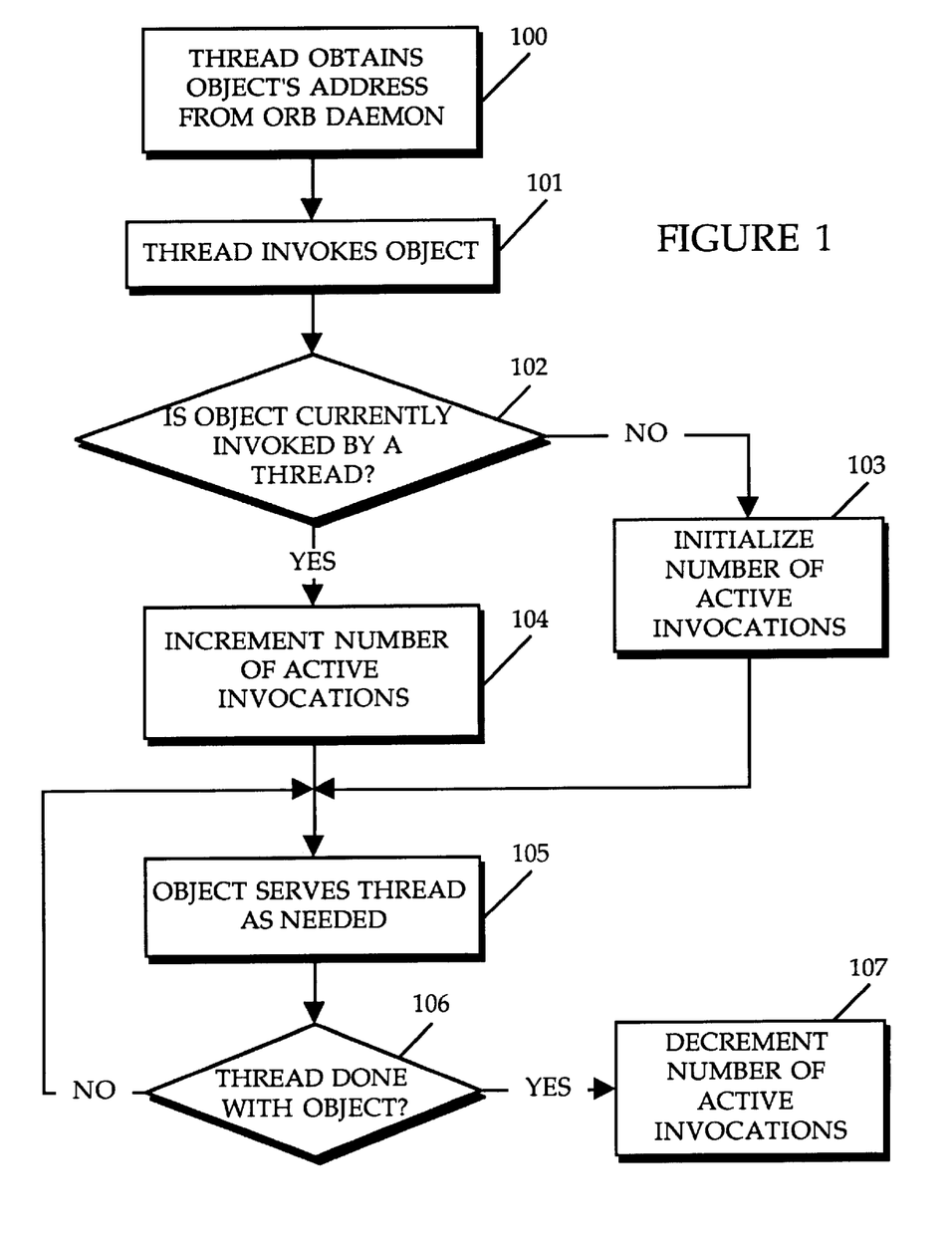
FIG. 1 is a flow diagram of a prior art process for a thread invoking an object.

FIG. 1 is a flow diagram illustrating the object invoking process. In step 100, a thread obtains the address for an object from the ORB daemon, e.g., via a locate request. In step 101, the thread invokes the object with a method invocation directed to the object's address. In step 102, a branch occurs based on whether the object being invoked is already currently invoked by another thread. If the object is currently invoked, then, in step 104, the active invocation count is incremented by one. If the object is not currently invoked by another thread, then, in step 103, the active invocation count is initialized to reflect the invocation.

Steps 103 and 104 lead into step 105. In step 105, the object serves the thread in the requested manner. In step 106, if the thread is done utilizing the method provided by the object, then the thread, or invocation, exits, and the number of active invocations is decremented by one in step 107. If the thread is not finished utilizing the object, then the process returns to step 105.

Figure 2:
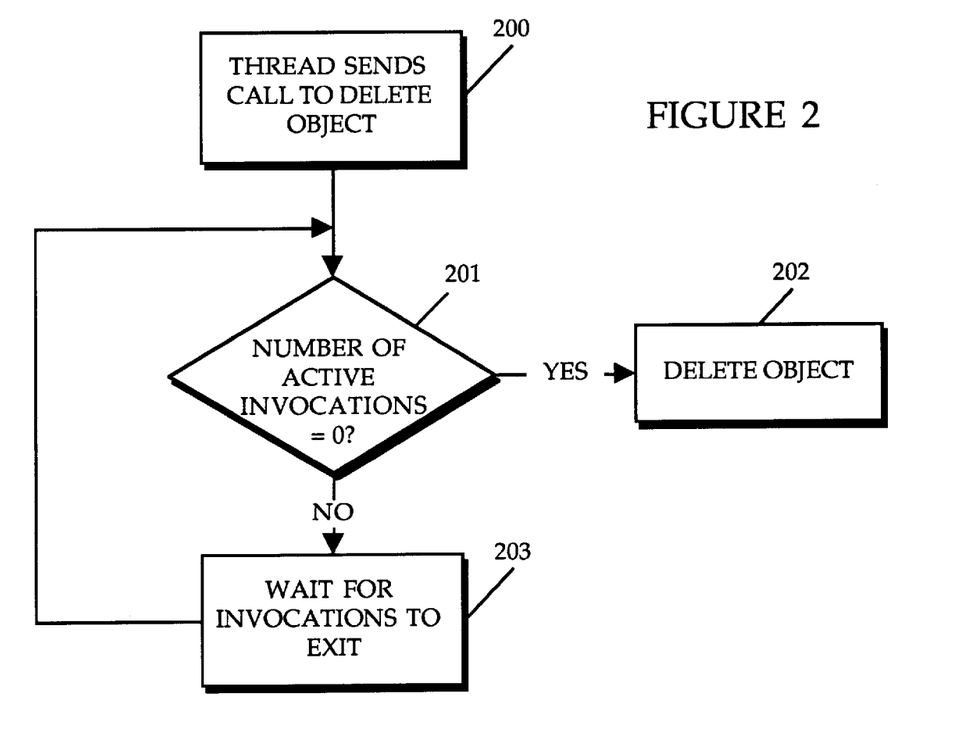
FIG. 2 is a flow diagram of a prior art process for a thread deleting an object.

In the manner illustrated in FIG. 1, multiple threads may invoke the same object, with successive invocations noted in the active invocation count. As stated previously, while the active invocation count reflects thread activity, the object cannot be disposed without disrupting processes out of hand. FIG. 2 illustrates a process of the prior art for disposing of objects in the multi-threaded environment.

In step 200 of FIG. 2, a thread sends a call to delete the object In subsequent step 201, the number of active invocations for that object, i.e., the current number of threads accessing the object, is queried to determine if disposal can be performed without disrupting other processes. If the number of active invocations is zero, indicating that there are no other process threads accessing the object, then, in step 202, the object is deleted. However, if the current number of active invocations is not zero, then the object cannot be deleted yet. The disposing thread waits for active invocations to exit in step 203, and returns to step 201 to query the number of active invocations. Thus, the object is not deleted until the number of active invocations reaches zero.

While the thread waits to delete the object, the number of active invocations is updated to reflect the completion of active threads and the arrival of new threads as illustrated in FIG. 1. When step 201 finally tests positive for zero active invocations, the object is deleted.

Using the process of FIG. 2 to dispose of objects can result in long delays while the deleting object waits for active invocations to clear. Further, because of the possibility for new thread invocations, there is no guarantee that the deletion process will ever complete. This can result in the continued use of an invalid object and/or the undesired continuing occupation of valuable storage by the undeleted object.

No process exists for the handling of multiple deletion requests in the process of FIG. 2. Deletion requests by subsequent threads are kept waiting, as with the original deletion call, until the active invocations clear. This is unnecessary and undesired as it increases the network overhead to account for the waiting threads in each case.

SUMMARY OF THE INVENTION

The present invention provides a method and apparatus for providing thread-safe disposal of objects in a multi-threaded computer environment. When a thread from a process sends a call to delete an object, that thread typically waits for other threads interacting with that same object to clear. During this waiting period, it is common to have other threads invoking the same object, thus increasing rather than decreasing the number of active threads for that object. Also, problems arise when more than one thread attempts to delete the object.

The present invention associates a state machine with each object. When an invocation of an object is made, the state machine is queried to detect the state. Invocations made on the object after the occurrence of a delete call interpret the object as having been deleted, and are not added to the active invocations for that object. Further, subsequent delete calls also interpret the object as having been deleted, and return a failure indication. The initial delete call returns success when the object is finally deleted. Thus, new invocations are precluded and multiple delete calls are handled appropriately.

During standard operation, the state of an object is registered as "existing." The object enters a "to be deleted" state when a thread sends a call to delete the object. Subsequent invocation attempts by other threads interpret the state of the object as "deleted," and thus are blocked from this instantiation of the object. After all active threads have cleared from the object, the state of the object is changed to "deleted," and the system disposes of the object.

DETAILED DESCRIPTION OF THE INVENTION

A method and apparatus for disposing of objects in a multi-threaded environment is described. In the following description, numerous specific details are set forth in detail to provide a more thorough description of the invention. It will be apparent, however, to one skilled in the art, that this invention can be practiced without these specific details. In other instances, well known features have not been described in detail so as not to unnecessarily obscure the invention.

Figure 4:
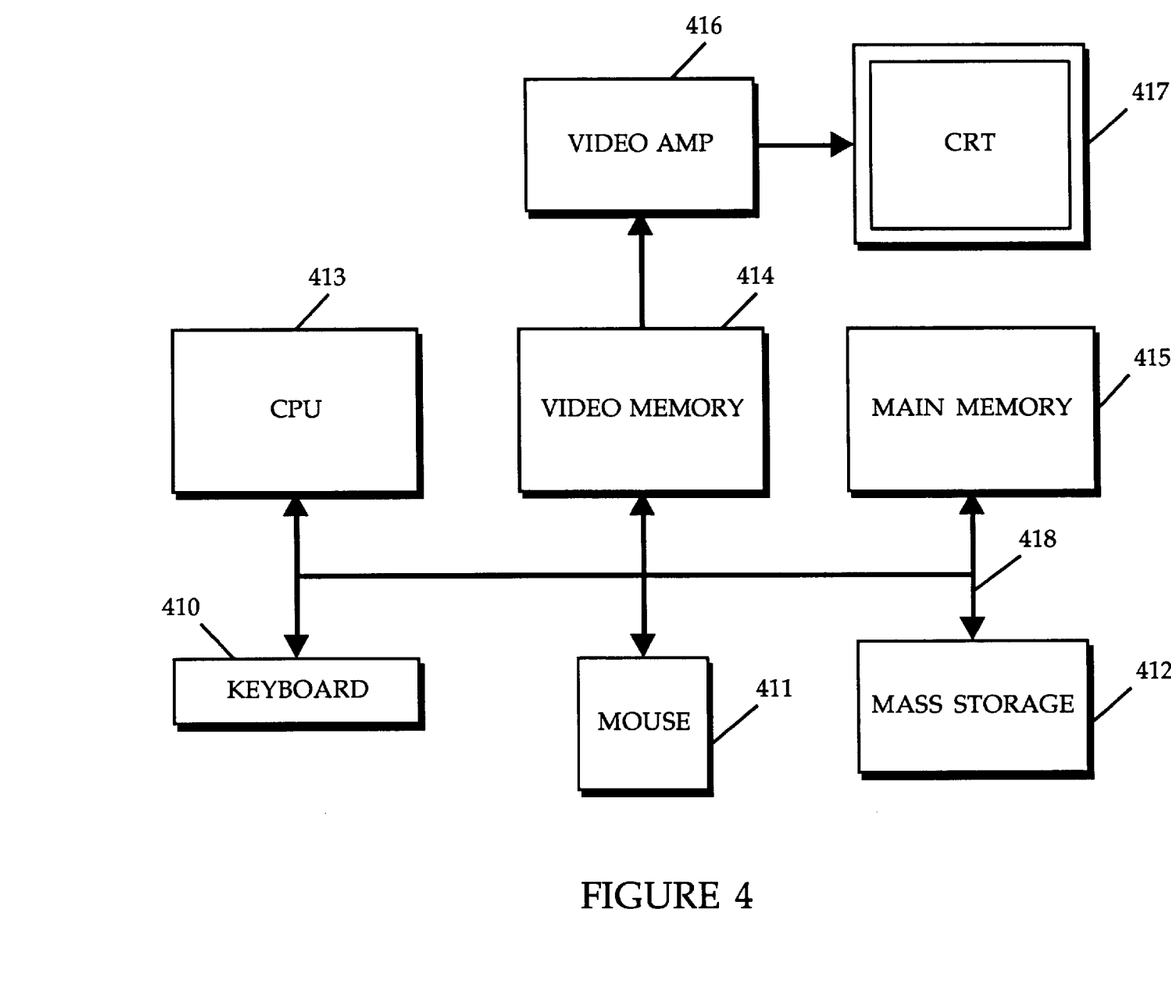
FIG. 4 is a block diagram of a suitable hardware system for implementing the present invention.

The present invention can be implemented on a general purpose computer such as illustrated in FIG. 4. A keyboard 410 and mouse 411 are coupled to a bidirectional system bus 418 The keyboard and mouse are for introducing user input to the computer system and communicating that user input to central processing unit (CPU) 413. The computer system of FIG. 4 also includes a video memory 414, main memory 415 and mass storage 412, all coupled to bidirectional system bus 418 along with keyboard 410, mouse 411 and CPU 413. The mass storage 412 may include both fixed and removable media, such as magnetic, optical or magnetic optical storage systems or any other available mass storage technology. Bus 418 may contain, for example, thirty-two address lines for addressing video memory 414 or main memory 415. The system bus 418 also includes, for example, a 32-bit data bus for transferring data between and among the components, such as CPU 413, main memory 415, video memory 414 and mass storage 412. Alternatively, multiplex data/address lines may be used instead of separate data and address lines.

In the preferred embodiment of this invention, the CPU 413 is a 32-bit microprocessor manufactured by Motorola, such as the 680X0 processor or a microprocessor manufactured by Intel, such as the 80X86, or Pentium processor. However, any other suitable microprocessor or microcomputer may be utilized. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images.

In a network environment, the apparatus of FIG. 4 is coupled to other similar apparatus using suitable communications hardware and software as is known in the art Front ends systems for accessing the shared services of the network may comprise PC systems running Windows™, web browsers supporting the Java™ application interface, workstations running Solaris™, or other suitable systems, including combinations thereof.

The computer systems described above are for purposes of example only. The present invention may be implemented in any type of computer system or programming or processing environment.

In the prior art, when a thread from a process sends a call to delete an object, that thread typically waits for other threads interacting with that same object to clear. During this waiting period, it is common to have other threads invoking the same object, thus increasing rather than decreasing the number of active threads for that object. There is therefore no guarantee that the object will be deleted at all, let alone in a reasonable amount of time. Also, problems arise in the prior art when more than one thread attempts to delete the object. Typically, each deleting thread waits until the other threads have cleared, thus increasing the number of waiting threads unnecessarily.

The present invention provides a method and apparatus for ensuring that, upon the reception of an initial delete request, an object is ultimately deleted, and that the object is deleted in a timely fashion. Further, a process is provided for processing subsequent delete requests to prevent the addition of needlessly waiting threads to the server queue.

The present invention utilizes a state machine to process invocations and delete requests. A state table is provided wherein the current state of an object is stored. The current number of active invocations may be stored there as well. Whenever a request is sent to the object, the state table is queried to determine the current state of the object. Depending on what the current state is and what type of request is being made, a suitable response to the request is determined. Thus, a framework for precluding certain types of requests during certain states is provided.

The state table is implemented in a process as part of the object server. A three-state variable assigned to the object is sufficient to store the current state, though other methods for storing a state value may be used. A table of variables referenced by object, or a state table, wherein one variable is assigned to each object, may be implemented in an object server and queried by object as needed. A routine for providing a response to certain requests based on the contents of an object's state variable is provided in the object server.

Figure 7:
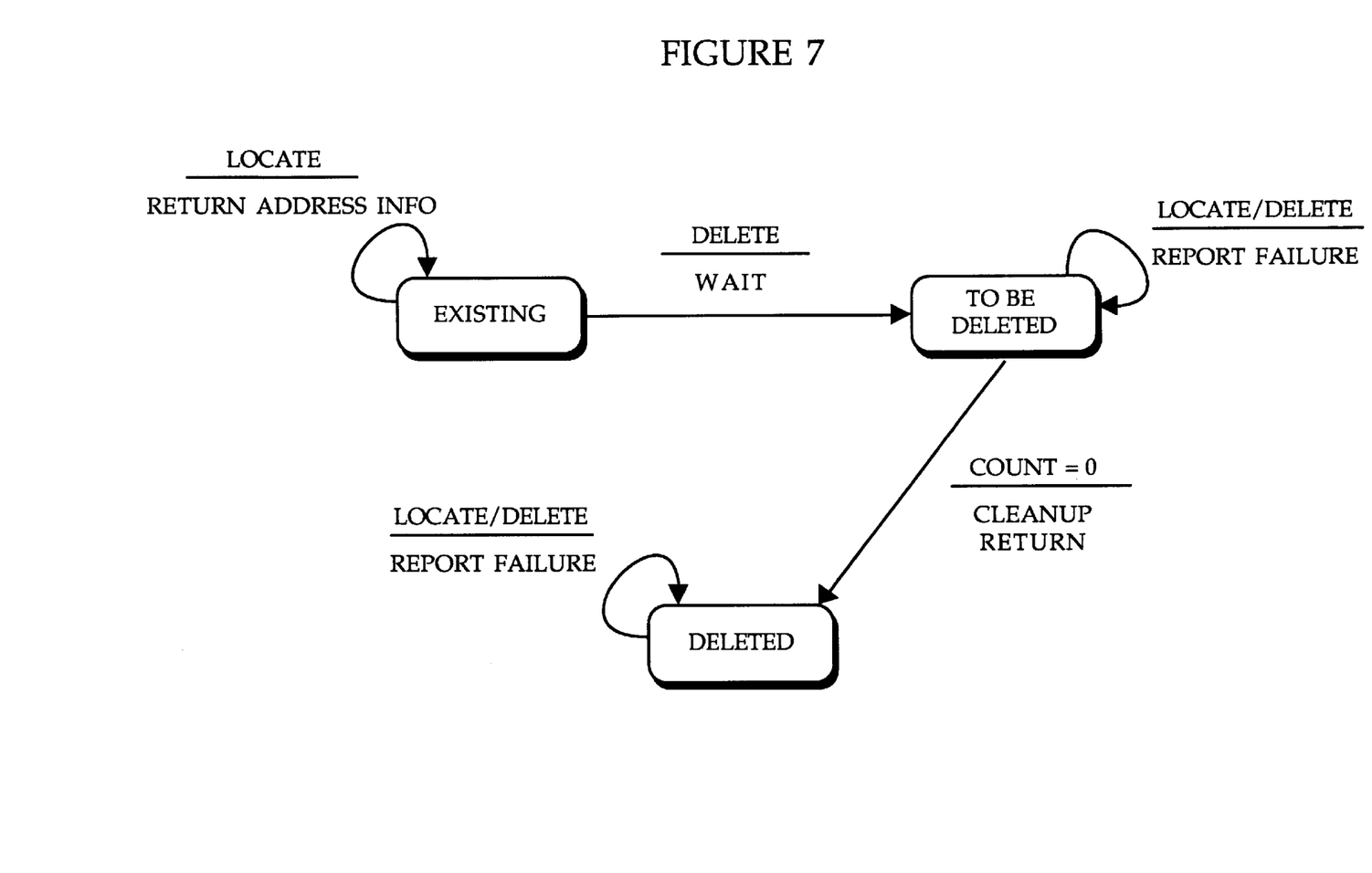
FIG. 7 is a diagram of an object state machine according to the method and apparatus of the present invention.

FIG. 7 is a state diagram for one embodiment of a three-state state machine suitable for handling locate and delete calls for an object targeted in the call. When the object is instantiated and operating in the standard manner, the state of the object is designated as "existing." Instantiation of the object may occur as part of the startup process of the associated object server, or instantiation may occur in response to the first locate request targeted at the object. In either case, the object is registered in the state table as "existing." When the object has received a delete request and is waiting to be deleted, the state of the object is designated as "to be deleted." Finally, when there are no active threads and the object is to be disposed of or has been disposed of, the state of the object is designated as "deleted."

In the "existing" state, if a request is received from a thread, the request is forwarded to the object. If a delete request is received from a thread, the thread is made to wait, and the state of the target object is advanced to "to be deleted."

In the "to be deleted" state, if requests are received from a thread, a response is generated as if the target object were deleted, thus precluding further invocations after a delete request has been made. If a delete request is received in this state, the request returns and indicates failure, thus preventing the unnecessary waiting of the requesting thread and appropriate handling for delete requests subsequent to the original delete request.

An active invocations value maintains a count of the number of threads that are referencing an object. When a thread generates a request for an object, the object's active invocations value is changed to indicate the reference. When there are no referencing threads, the active invocations value is zero. This active invocations value may be stored in the state table as a second entry referenced by object, as a value stored separately on the object server, or as a value stored in the object itself. The state is advanced from "to be deleted" to "deleted" when the active invocations value reaches zero. Cleanup procedures for the object are initiated and the waiting thread returns and indicates successful deletion of the object.

In the "deleted" state, if a request is received from a thread, the request is treated as if the target object is deleted, and no invocation takes place. If a delete request is received from a thread, the delete request returns indicating failure.

One embodiment for a routine which implements the above state machine comprises software code which responds to requests by querying the state table to determine the target object's current state. Depending on the state and the request type, one portion of the software code returns a failure indication or a wait indication, or triggers the invocation on the object. The state variable of the target object is updated upon the conditions specified with respect to FIG. 7.

When the state is set to "to be deleted," another portion of software code triggers a "watch for" condition on the active invocation value for the target object. When the active invocation value reaches zero, the software code triggers object cleanup routines and returns a success indication on the waiting thread.

It will be obvious that the above embodiment is only one possible implementation, and that the state machine may be implemented in other similar embodiments without going beyond the scope of the present invention.

Figure 5:
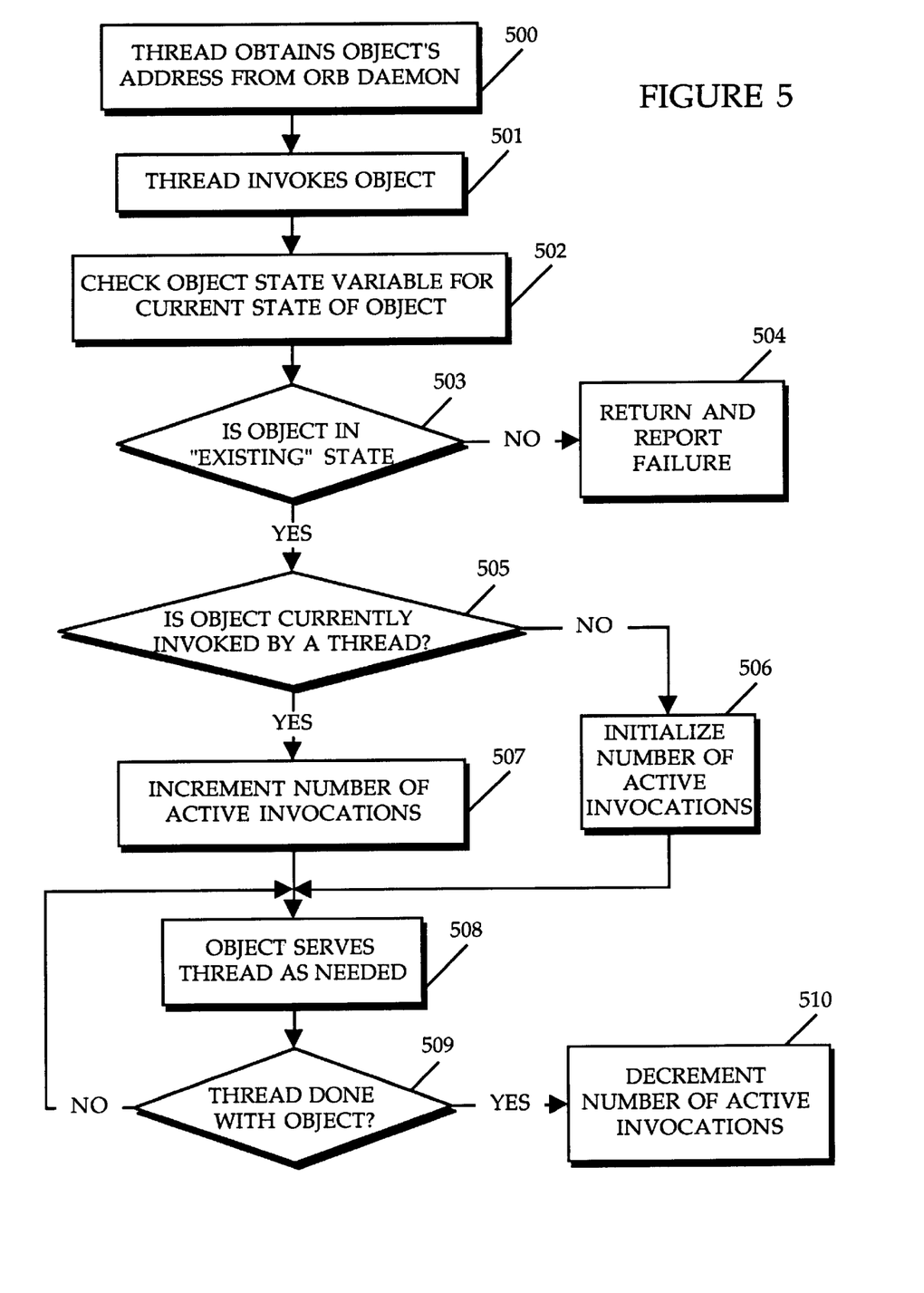
FIG. 5 is a flow diagram of the process for a thread invoking an object according to one embodiment of the present invention.

FIG. 5 is a flow diagram of a process for a thread involving an object according to one embodiment of the present invention. The process begins in step 500 when a thread obtains the object's address from the ORB daemon, e.g., via a locate request In step 501, the thread invokes the object with a method invocation directed to the object's address. In step 502, the state machine checks the state variable assigned to the target object to determine the current state. If, in step 503, the object is not in the "existing" state, i.e., the object is either "to be deleted" or "deleted," then, in step 504, the thread returns and reports failure. Thus, new invocations are precluded while the object is waiting to be deleted. If, however, in step 503, the state variable reflects that the target object is in the "existing" state, i.e., in standard operation, then the process progresses to step 505.

In step 505, a branch occurs based on whether the object being invoked is already currently invoked by another thread. If the object is currently invoked, then, in step 507, the active invocation count is incremented by one. If the object is not currently invoked by another thread, then, in step 506, the active invocation count is initialized to reflect the invocation.

Steps 506 and 507 lead into step 508. In step 508, the object serves the thread in the requested manner. In step 509, if the thread is done utilizing the method provided by the object, then the thread, or invocation, exits, and the number of active invocations is decremented by one in step 510. If the thread is not finished utilizing the object, then the process returns to step 508.

Figure 6:
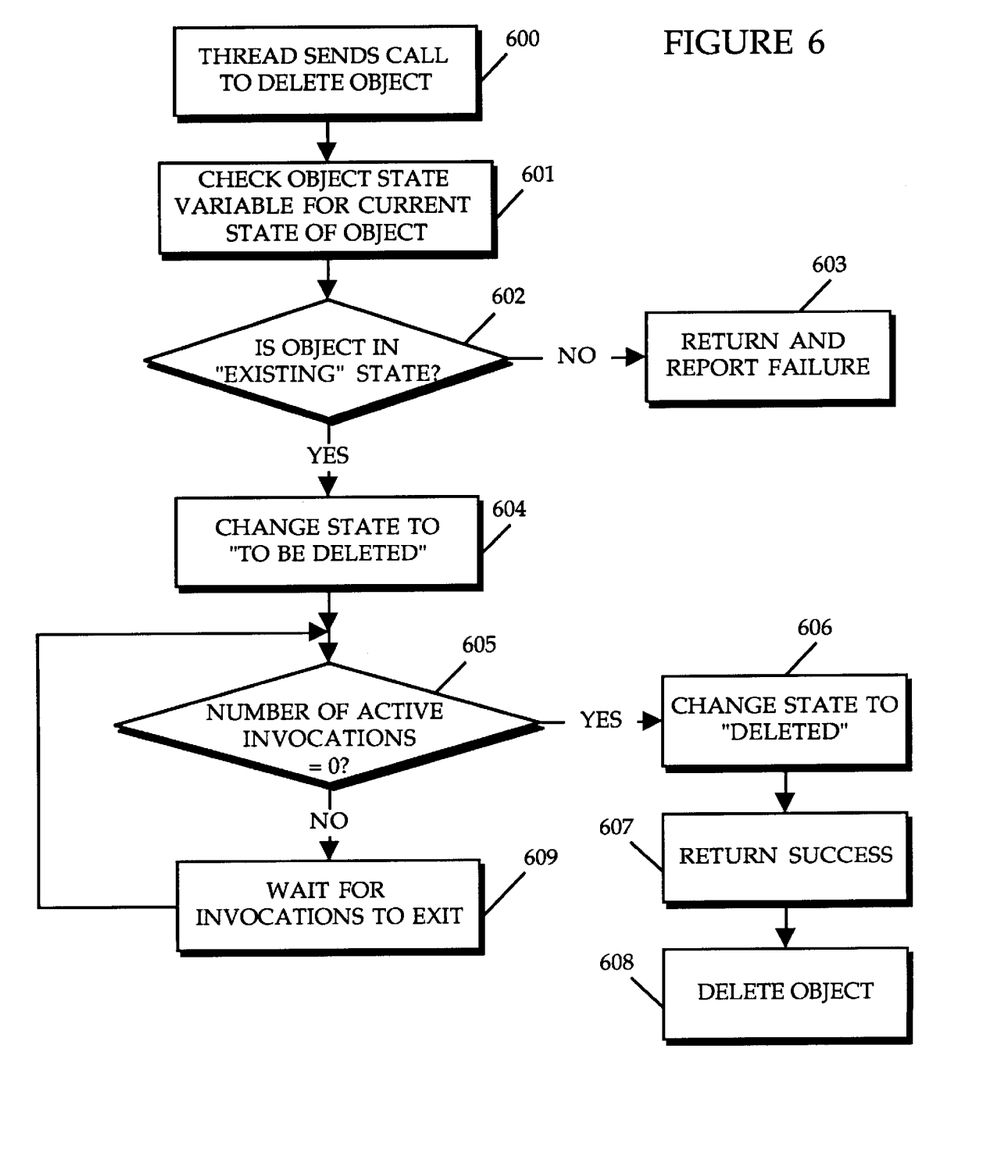
FIG. 6 is a flow diagram of a process for a thread deleting an object according to one embodiment of the present invention.

FIG. 6 is a flow diagram of a process for a thread attempting to delete an object by sending a delete request according to one embodiment of the present invention. The process begins in step 600 when the thread sends the delete request to the target object. In step 601, the state machine checks the state variable assigned to the target object to determine the current state. If, in step 602, the object is not in the "existing" state, i.e., the object is either "to be deleted" or "deleted," then, in step 603, the thread returns and reports failure. Thus, new delete requests are handled appropriately when the object is already waiting to be deleted. If, however, in step 602, the state variable reflects that the target object is in the "existing" state, i.e., in standard operation, then the process progresses to step 604.

In step 604, the state variable for the target object is set to "to be deleted," and the requesting thread waits for the deletion process to complete. In step 605, if the active invocations value is zero, indicating there are no active invocations, the process moves directly to step 606. If, however, the active invocations value is greater than zero, indicating that active invocations remain for the target object, then, in step 609, the process waits for invocations to exit, then returns to step 605.

While the thread waits to delete the object, the number of active invocations is updated to reflect the completion of active threads and the arrival of new threads as illustrated in FIG. 5. Step 605 may test the number of active invocations at timed intervals, or it may test the number of active invocations after each increment or decrement operation. When step 605 tests positive for zero active invocations, the process progresses to step 606.

When all of the active threads have cleared from the target object, in step 606, the state variable is set to "deleted." Then, in step 607, the waiting thread responsible for the delete request returns with a success indicator. In the subsequent step, cleanup procedures are run to delete the object and reclaim the associated memory.

By preventing further invocations of the object when the object is not in the "existing" state, the present invention ensures that the active invocations value will continue to decrease, further ensuring that the deletion operation occurs in a timely manner.

Also, by reporting failure on subsequent delete requests, the present invention prevents unnecessary threads from lingering and ensures the appropriate handling of multiple delete requests, i.e., the success of one delete request and the failure of all other delete requests.

Thus, a method and apparatus for disposing of objects in a multi-threaded environment has been described in conjunction with one or more specific embodiments. The invention is defined by the claims and their full scope of equivalents.

What is claimed is:

1. A method for disposing of objects in a computer environment comprising:

in an object server, associating a state with an object in a computer environment;

in response to an object deletion request from a first client thread, said object server changing said state from a first state value to an intermediate state value; and said object server changing said state from said intermediate state value to a third state value when a number of active invocations reaches zero.

2. The method of claim 1 further comprising:
when said state changes to said third state value:
   deleting said object; and
   causing said first client thread to return.

3. The method of claim 1 further comprising the step of:
causing a second thread to report failure on an object deletion request from said second thread when said state comprises said intermediate state value.

4. The method of claim 1 further comprising the step of:
precluding further invocations of said object while said state comprises said intermediate state value.

5. The method of claim 1 further comprising:
invoking said object in response to a request from said first client thread; and
upon invocation by said first client thread, setting said state to said first state value.

6. The method of claim 1 wherein said first state value comprises an "existing" indication.

7. The method of claim 1 wherein said intermediate state value comprises a "to be deleted" indication.

8. The method of claim 1 wherein said third state value comprises a "deleted" indication.

9. The method of claim 1 wherein said state is maintained in a table referenced by object.

10. A computer program product comprising:
a computer usable medium having computer readable program code embodied therein for disposing of objects in a multi-threaded environment, said computer program product comprising:
   computer readable program code configured to cause a computer to associate a state in an object server with an object;
   computer readable program code configured to cause said object server to change said state from a first state value to an intermediate state value in response to an object deletion request from a first client thread; and
   computer readable program code configured to cause said object server to change said state from said intermediate state value to a third state value when a number of active invocations reaches zero.

11. The computer program product of claim 10 further comprising:
   computer readable program code configured to cause a computer to delete said object when said state changes to said third state value; and
   computer readable program code configured to cause a computer to cause said first client thread to return when said state changes to said third state value.

12. The computer program product of claim 10 further comprising:
   computer readable program code configured to cause a computer to cause a second thread to report failure on an object deletion request from said second thread when said state comprises said intermediate state value.

13. The computer program product of claim 10 further comprising:
   computer readable program code configured to cause a computer to preclude further invocations of said object while said state comprises said intermediate state value.

14. The computer program product of claim 10 further comprising:
   computer readable program code configured to cause a computer to invoke said object in response to a request from said first client thread; and
   computer readable program code configured to cause a computer to set said state to said first state value upon invocation by said first client thread.

15. The computer program product of claim 10 wherein said first state value comprises an "existing" indication.

16. The computer program product of claim 10 wherein said intermediate state value comprises a "to be deleted" indication.

17. The computer program product of claim 10 wherein said third state value comprises a "deleted" indication.

18. The computer program product of claim 10 wherein said state and said number of active invocations are maintained in a table referenced by object.

19. Apparatus for disposing of objects in a multi-threaded computer environment, comprising:
   a central processing unit (CPU);
   an object having an active invocation value;
   a state table having a state variable associated with said object;
   a process being executed by said CPU, said process comprising software program code having a first portion of code and a second portion of code;
   wherein said first portion of code is responsive to a request from a client thread by accessing said state variable, said first portion of code returning a response to said client thread dependent on the contents of said state variable;
   wherein, when said state variable is in a first state, said first portion of code responds to a request from said client thread to delete said object by changing said state variable to a second state; and
   wherein said second portion of code is responsive to a change in said state variable by disposing of said object when said active invocation value reaches zero.

20. The apparatus of claim 19 wherein said state variable comprises a first state, a second state and a third state.

21. The apparatus of claim 20 wherein, when said state variable is in said first state, said first portion of code responds to an invocation request by forwarding said invocation request to said object.

22. The apparatus of claim 20 wherein, when said state variable is in said second state and said third state, said first portion of code responds to a delete request and an invocation request by returning a failure indication.

23. The apparatus of claim 20 wherein said second portion of code is responsive to a change in said state variable from said first state to said second state.

24. The apparatus of claim 20 wherein said second portion of code changes said state variable to said third state when said active invocation value reaches zero.

25. The apparatus of claim 20 wherein said process returns a success indication to said client thread when said second portion of code disposes of said object.

26. Apparatus for disposing of objects in a multi-threaded environment, comprising:
   an object having an active invocation number; and
   a state machine responsive to requests directed at said object, wherein, in a first state, said state machine changes to a second state in response to a request from a client thread to delete said object.

27. The apparatus of claim 26 wherein, in said first state, said state machine responds to an invocation request by forwarding said invocation request to said object.

28. The apparatus of claim 26 wherein, in said second state, said state machine precludes invocation requests, and said state machine responds to a second request to delete said object by returning a failure indication.

29. The apparatus of claim 28 wherein, when said state machine is in said second state and said active invocation number reaches zero, said state machine deletes said object.

30. The apparatus of claim 29 wherein, when said object is deleted, said state machine returns a success indication to said client thread responsible for causing said state machine to change from said first state to said second state.

31. The apparatus of claim 29 wherein, when said object is deleted, said state machine changes to a third state.

32. The apparatus of claim 29 wherein, in said third state, said state machine precludes invocation requests, and said state machine responds to said delete requests by returning a failure indication.

33. The apparatus of claim 26 wherein said state machine is implemented as a process in an object server.

\* \* \* \* \*